(12) United States Patent
Nguyen et al.

(10) Patent No.: US 6,311,014 B1
(45) Date of Patent: Oct. 30, 2001

(54) UNIFIED AUDIO/VIDEO INTERFACE FOR A DIGITAL VIDEO DISK SYSTEM

(75) Inventors: Loc Nguyen, Laguna Niguel; Li Zhu, Mission Viejo, both of CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/997,886

(22) Filed: Dec. 24, 1997

(51) Int. Cl.$^7$ .................................................. H04N 5/781
(52) U.S. Cl. .......................... 386/125; 386/111; 345/327; 348/12
(58) Field of Search ................................... 386/1, 45, 33, 386/46, 125, 126, 111–112; 348/7–16, 552, 553, 571, 725; 369/1, 13–16, 47–48, 53–54; 360/39, 55, 48; 345/326, 327–329, 333–334, 961, 970, 971; 455/3.1, 3.2, 4.1, 4.2, 6.1–6.3; H04N 5/76, 5/92, 5/781, 7/10

(56) References Cited

U.S. PATENT DOCUMENTS

| | | | |
|---|---|---|---|
| Re. 35,859 | * 7/1998 | Gardner et al. | 348/552 |
| 5,297,231 | * 3/1994 | Miller | 704/201 |
| 5,687,334 | * 11/1997 | Davis et al. | 345/339 |
| 5,761,698 | * 6/1998 | Combs | 711/100 |
| 5,805,821 | * 9/1998 | Saxena et al. | 709/231 |
| 5,872,922 | * 2/1999 | Hogan et al. | 348/13 |
| 5,973,682 | * 10/1999 | Saib et al. | 345/327 |
| 6,031,529 | * 2/2000 | Migos et al. | 345/340 |
| 6,061,655 | * 5/2000 | Xue et al. | 704/500 |
| 6,075,534 | * 6/2000 | VanBuskirk et al. | 345/348 |
| 6,100,883 | * 8/2000 | Hoarty | 345/327 |

* cited by examiner

Primary Examiner—Thai Tran
(74) Attorney, Agent, or Firm—W. Daniel Swayze, Jr.; Wade James Brady, III; Frederick J. Telecky, Jr.

(57) ABSTRACT

An interface for a digital video disk system utilizing a small number of pins which allows a requesting device to initiate data requests and which avoids the phenomenon of lock-up. The interface includes an input interface terminal at which a data request signal from an output device is received in a first mode and at which a sampling signal is received from the output device in a second mode; a first output interface terminal at which a sampling/synchronizing signal is transmitted from the source device to the output device in the first mode, the sampling/synchronizing signal synchronizing and sampling the data request signal, and at which a first synchronizing signal is transmitted from the source device to the output device in the second mode, the first synchronizing signal synchronizing data output; at least one data output interface terminal at which requested data is transmitted from the source device to the output device in the first and second modes, a second output interface terminal at which a second synchronization signal is transmitted from the source device to the output device at the start of data transmission in the first mode; a third output interface terminal at which a data strobe signal is transmitted from the source device to the output device in the first mode, the data strobe signal latching the requested data, and at which a third synchronization signal is transmitted from the source device to the output device in the second mode, the third synchronization signal synchronizing the left/right audio frames; and a fourth output terminal at which a data error signal is transmitted from the source device to the output device in the first and second modes, the data error signal indicating that the requested data contains an error.

29 Claims, 5 Drawing Sheets

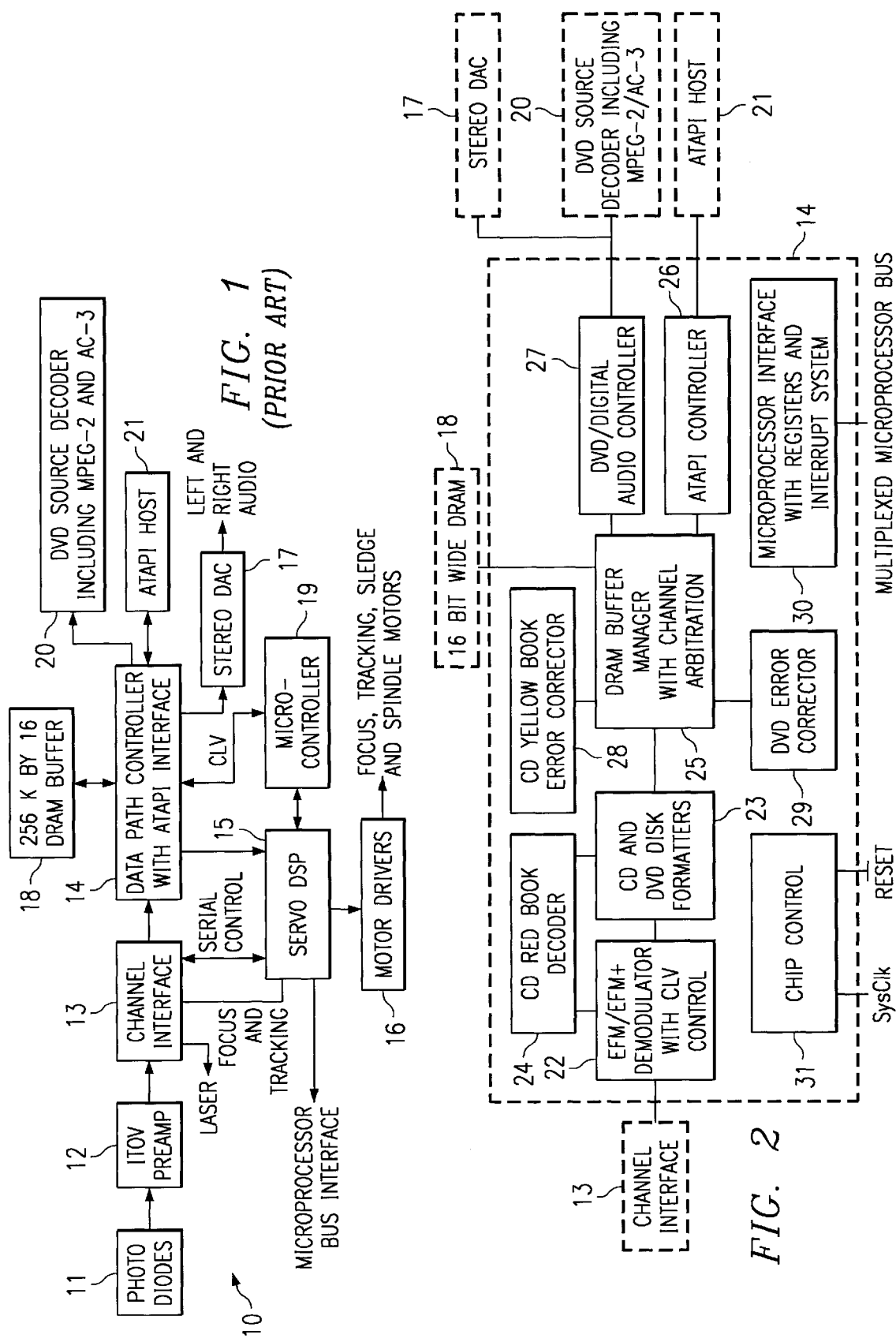

UNIFIED AUDIO/VIDEO INTERFACE FOR A DIGITAL VIDEO DISK SYSTEM

FIELD OF THE INVENTION

The present invention relates to the field of digital video disk (DVD) systems, and more particularly to a universal audio/video interface for interfacing DVD electronics to a DVD player having an MPEG-2/AC-3 decoder or to a stereo DAC in a CD-ROM or DVD-ROM application.

BACKGROUND OF THE INVENTION

DVD systems have become popular in recent years as home video entertainment systems. DVD systems may also be used to record, store and provide data, such as computer and computing systems, in larger quantities than have heretofore been practicable with other storage devices, e.g., CD-ROM drives.

A conventional DVD system consists of DVD electronics which may be interfaced to a DVD player, a personal computer having a CD-ROM, and a DVD-ROM. Referring to FIG. 1, conventional DVD electronics 10 include photo diodes 11 which receive laser light reflected from a spinning, information-encoded disk and pass the received light to a preamplifier 12 which converts light from an optical signal to an electrical voltage representing the information encoded on the disk. The electrical signals output from the preamplifier are amplified and noise-filtered by channel interface 13, which may be Channel Interface SSI 33P3725 manufactured by Silicon Systems, Inc. of Tustin, Calif. The channel interface 13 includes a built-in phase locked loop (PLL) which generates a data clock that is output, along with the amplified data, to data path controller 14. Channel interface 13 also automatically controls the power of the laser scanning the disk and outputs a signal to a servo digital processor (DSP) 15 which indicates the focus and phase tracking of the laser.

Data path controller 14 decodes, corrects and stores the data received from the channel interface 13 in a DRAM buffer 18 for output, which will be described in detail later. Data path controller 14 generates and outputs a CLV signal to a servo DSP 15. Based on this signal and the focus and tracking signals received from channel interface 13, servo DSP 15 generates and inputs a control signal to motor drivers 16 that control the spindle motors spinning the disk, the movement of the laser read heads, and the focus of the laser (not shown). Servo DSP SSI 33H3825 and Data Path Controller SSI 33C3925 are examples of such devices.

The above-described DVD electronics configuration may be interfaced with a variety of devices including a DVD source decoder (MPEG-2/AC-3 decoder) 20, an ATA packet interface (ATAPI) host 21, and a stereo DAC 17. Microcontroller 19 includes firmware that is programmed to implement the applicable interfaces. Various problems have arisen with prior art interfaces to the DVD Source Decoder.

For example, conventional interfaces have occupied a large number of pins on the data path controller chip ("pins" are terminals by which electrical signals are carried to/from a chip), which is undesirable in view of physical space limitations and increased design complexity. Further, a device interfaced to prior art DVD electronics may not be able to initiate a request for data from memory.

Interfaces in the prior art have also been prone to "lock-up," which causes both the data path controller and the interfaced device to be placed in a wait state simultaneously and indefinitely. Lock-up occurs due to miscommunication during conventional "handshaking" procedures. In the usual scenario, a requesting device sends a request signal in the form of a pulse (a signal which changes from a low level to a high level for a short period of time and returns to the low level) and awaits an acknowledge signal from a source device. If, however, the request pulse is lost during transmission, the source device will never send its acknowledge signal and the requesting device will not know that its request pulse was lost. Even if the source device periodically samples the request signal to check for data requests, the lost pulse would not be detected because the signal on the data request line returned to the low level. The result is that both the requesting and source devices remain stalled, waiting for one another to send a signal.

What is desired is a simple, effective interface utilizing a small number of pins which allows a requesting device to initiate data requests and which avoids the phenomenon of lock-up.

SUMMARY OF THE INVENTION

It is an object of the present invention to provide a universal audio/video DVD-playback interface which interfaces in parallel to an MPEG-2/AC-3 decoder or serially to a stereo DAC in a CD-ROM or DVD-ROM application.

It is a further object of the present invention to provide a DVD-playback interface which utilizes a small number of pins and which allows a requesting device to initiate data requests.

It is a still further object of the present invention to provide a DVD-playback interface which avoids the phenomenon of lock-up.

To achieve the above objects, the present invention includes a source device interface including an input interface terminal at which a data request signal from an output device is received in a first mode and at which a sampling signal is received from the output device in a second mode; a first output interface terminal at which a sampling/synchronizing signal is transmitted from the source device to the output device in the first mode, the sampling/synchronizing signal synchronizing and sampling the data request signal, and at which a first synchronizing signal is transmitted from the source device to the output device in the second mode, the first synchronizing signal synchronizing data output; at least one data output interface terminal at which requested data is transmitted from the source device to the output device in the first and second modes, a second output interface terminal at which a second synchronization signal is transmitted from the source device to the output device at the start of data transmission in the first mode; a third output interface terminal at which a data strobe signal is transmitted from the source device to the output device in the first mode, the data strobe signal latching the requested data, and at which a third synchronization signal is transmitted from the source device to the output device in the second mode, the third synchronization signal synchronizing the left/right audio frames; and a fourth output terminal at which a data error signal is transmitted from the source device to the output device in the first and second modes, the data error signal indicating that the requested data contains an error.

BRIEF DESCRIPTION OF THE DRAWING FIGURES

The purpose and advantages of the present invention will be apparent to those skilled in the art from the following detailed description in conjunction with the appended drawings in which like reference characters are used to indicate like elements, and in which:

FIG. 1 is a block diagram illustrating a conventional DVD-playback system;

FIG. 2 illustrates a data path controller embodying the interface of the present invention;

DETAILED DESCRIPTION OF THE INVENTION

Figure 3A:
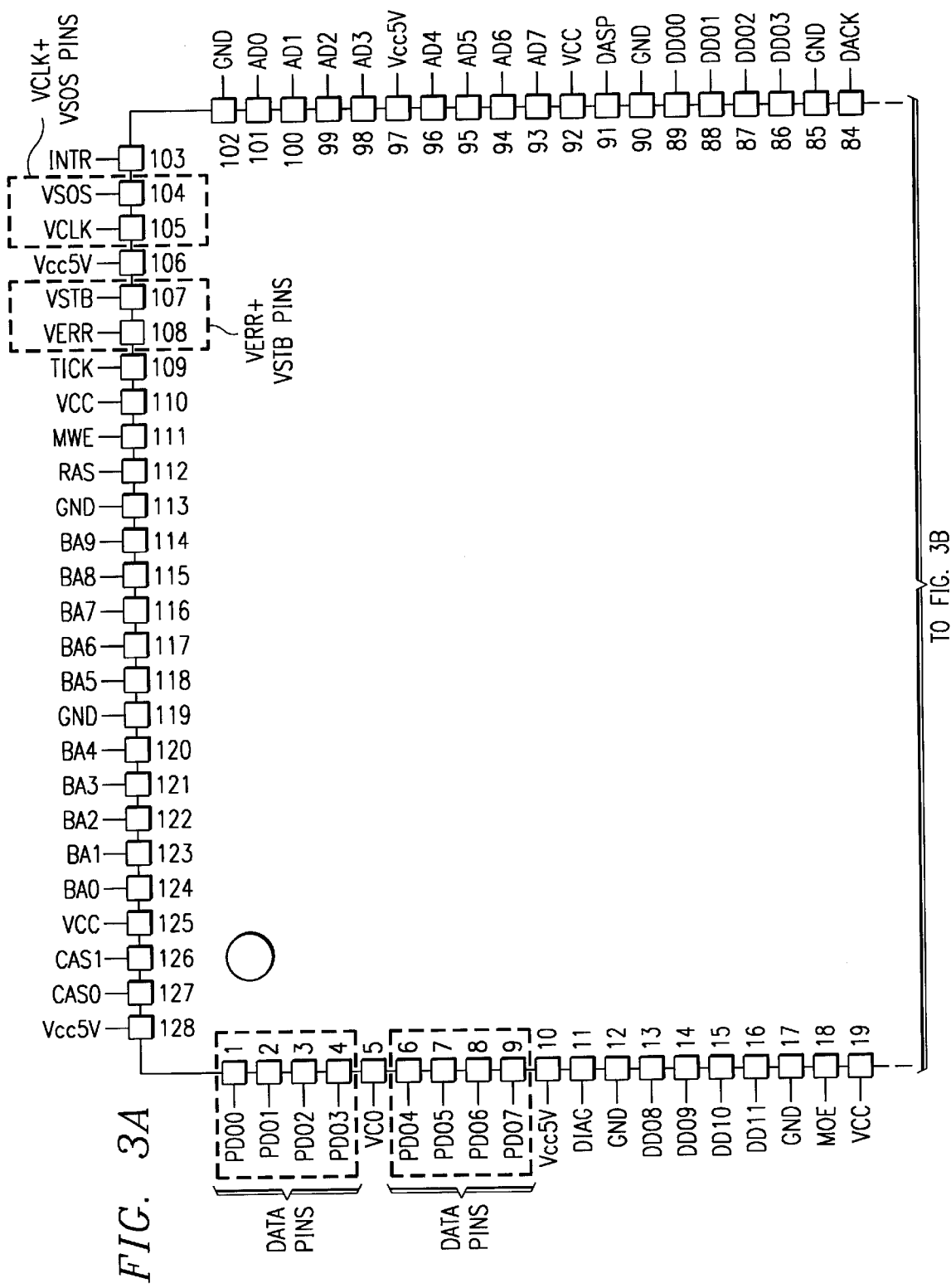
FIG. 3 illustrates the pin assignments of the data path controller of FIG. 2.

The pin functions of a data path controller in accordance with the present invention may be directed by programming a microcontroller to implement the desired functions. In the preferred embodiment, only thirteen pins of the data path controller chip are used to implement the interface of the present invention, as described in detail below.

A data path controller employing the interface of the present invention may interface in parallel to a DVD player having an MPEG-2/AC-3 decoder, to a CD-ROM (ATAPI interface), or serially to a stereo DAC. The ATAPI interface standard is well known to those skilled in the art and will not be described here.

FIG. 2 illustrates the elements of the above-referenced data path controller chip manufactured by SSI. The data received from the channel interface 13 is demodulated into byte-wide form by demodulator 22 and decoded in accordance with the Red Book standard, by a Red Book decoder 24. The demodulated and decoded data is then formatted into sectors by CD and DVD disk formatters 23 and input to a DRAM buffer manager 25, where a CD Yellow Book Error Corrector 28 corrects any errors in digital audio signals in accordance with the Yellow Book Standard, and a DVD Error Corrector 29 corrects any errors in the received DVD data.

Error-corrected data may then be read out of the Data Path Controller to: (1) DRAM buffer 18 via the DRAM buffer manager 25; (2) an ATAPI host 21 via an ATAPI controller 26; (3) a DVD player having an MPEG-2/AC-3 decoder 20 via a DVD/digital audio controller 27, or (4) a stereo DAC 17 via DVD/digital audio controller 27. Chip control 31 synchronizes the operations of the data path controller 14 with the overall DVD electronics system illustrated in FIG. 1.

Figure 3B:
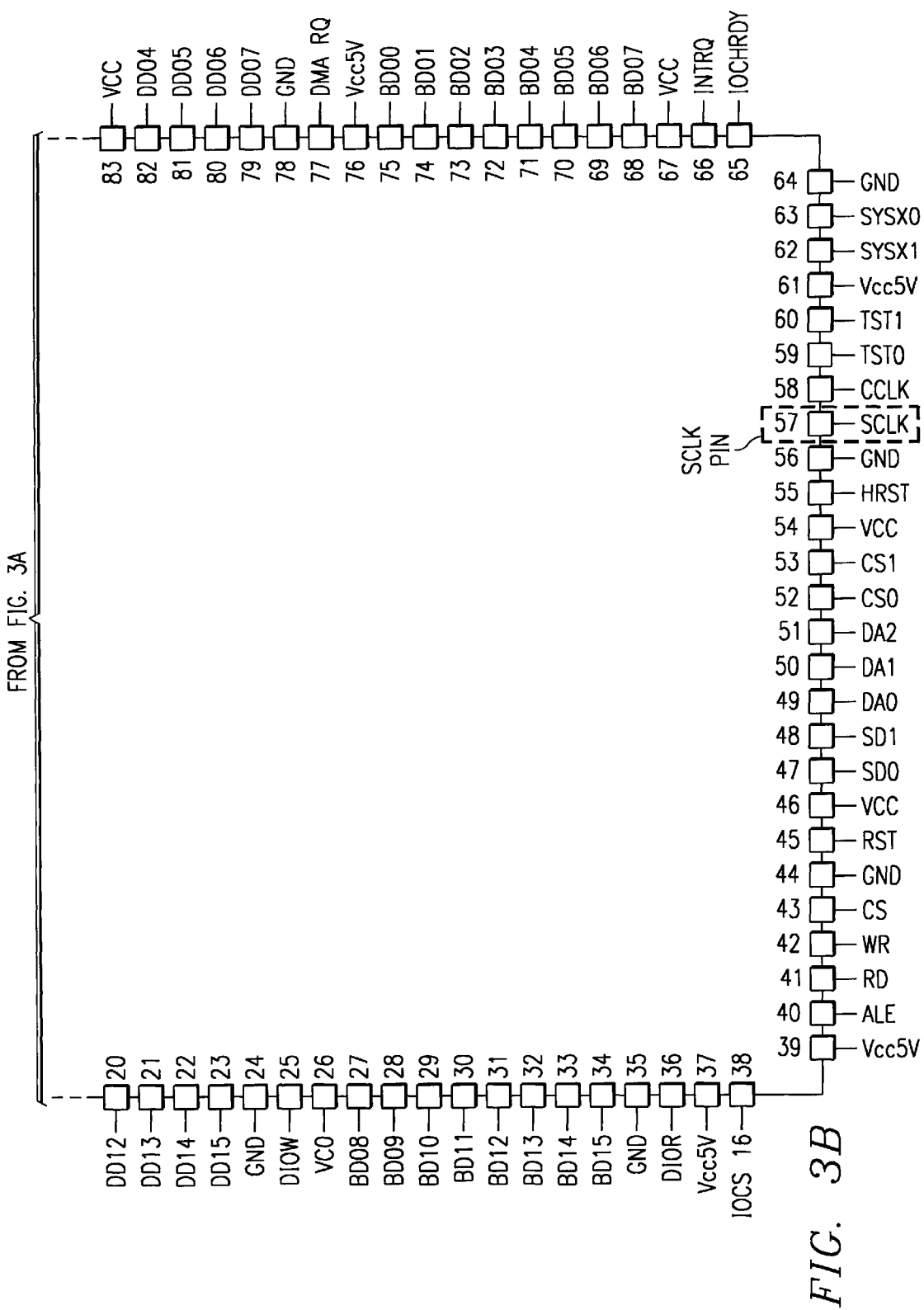

The universal audio/video interface of the present invention is implemented via thirteen pins of DVD/digital audio controller 27, as illustrated in FIG. 3. In a presently preferred embodiment, pins 1–4, 6–9, 57, 104–105, and 107–108 are used to implement a parallel interface, while pins 1, 57, 105, and 107–108 are used to implement a serial interface. Other pins could be used, however, without departing from the spirit or scope of the present invention.

The interface of the present invention is universal in that the same interface pins are used to carry audio and video data in both parallel and serial modes. The determination of an appropriate interface is performed automatically, as follows. A user initiates operation by turning system power ON and inserting a disk, e.g., a digital video disk (DVD) into a DVD player or a compact disc (CD) into a personal computer. The servo DSP 15 initiates a media detection sequence to determine whether a digital video disk or a compact disc was inserted by the user. This information is input to the firmware of microcontroller 19. Data is stored on digital video disks and compact discs in accordance with different standards and therefore must be decoded and processed accordingly. Microcontroller 19 sends a one-bit signal to microprocessor interface 30 to inform the data path controller 14 whether it will be interfacing with a DVD player or a personal computer for a CD application. Microcontroller 19 then sends a second one-bit signal to microprocessor interface 30 to inform the data path controller 14 whether a parallel or serial interface is necessary for specific data. DVD source decoder 20 interfaces to the Data Path Controller in parallel, while the stereo DAC interfaces to the Data Path Controller serially.

Figure 4:
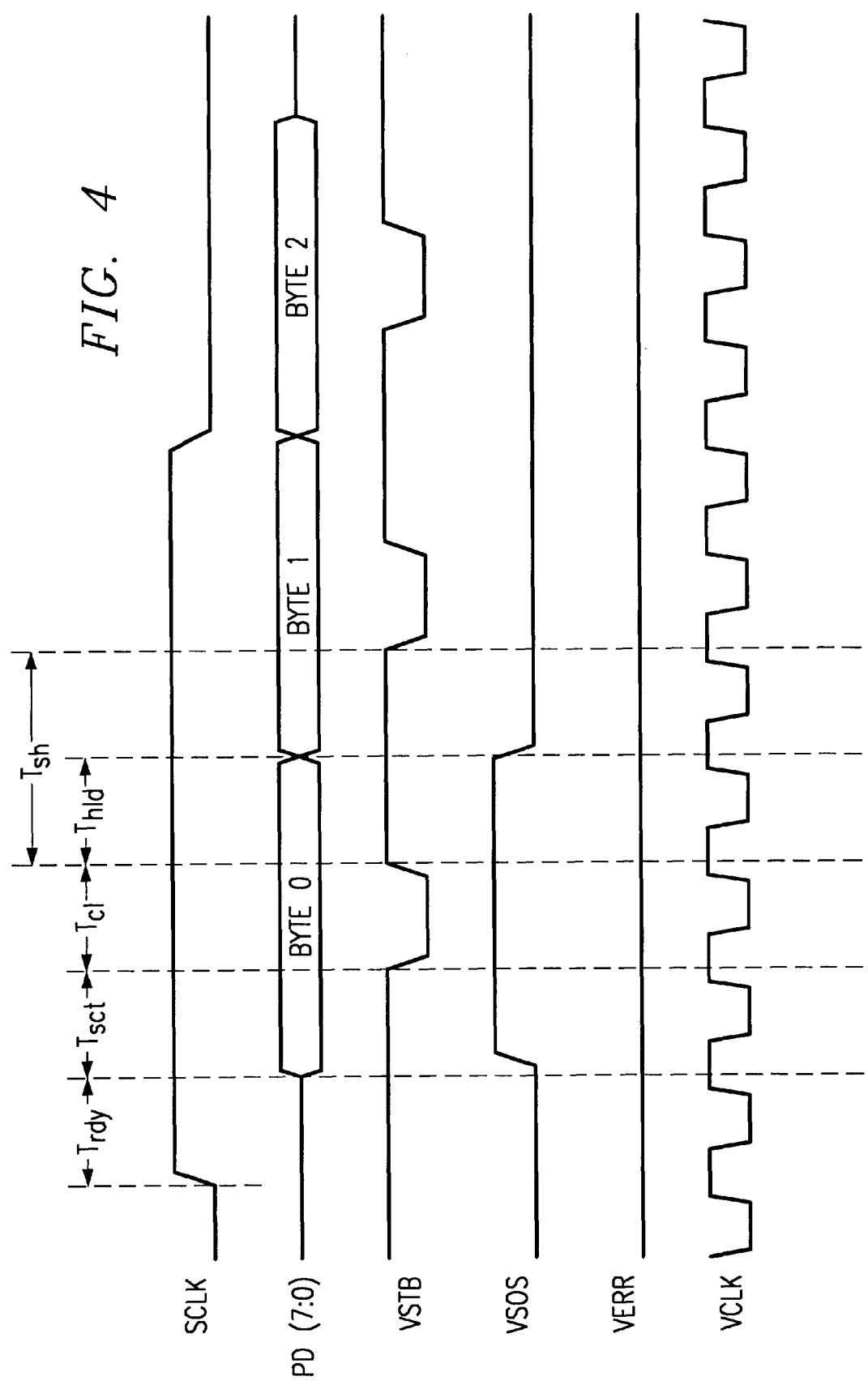
FIG. 4 is a timing diagram of the operation of the present invention in a parallel interface mode.

Interfacing to a DVD player with an MPEG-2/AC-3 decoder having a parallel interface will now be described with reference to FIG. 4. When the MPEG-2/AC-3 decoder has space in its buffer to accept data, it initiates a data request by asserting the SCLK signal which is received, in the preferred embodiment, on pin 57 of the data path controller chip. The SCLK signal is asserted by changing level from low to high and holding at high (FIG. 4(a)). In this manner, the SCLK signal may be periodically sampled to determine if data is still being requested (i.e., so long as the level remains high). This prevents lock-up from occurring when a pulse signal is transmitted from the requesting device and lost.

The DVD electronics may assert the VCLK signal on pin 105, which signals can be used to synchronize and sample the SCLK signal on the leading edge of VCLK (FIG. 4(f)). The assertion of this pin is optional in parallel mode and need not be employed. In the preferred embodiment of the invention, the VCLK frequency may be, for example, 40 MHz. The VSOS (start of sector) signal is asserted on pin 104 to specify that the first byte of a data sector is being transmitted (FIG. 4(d)).

Transmission of the requested data to the DVD player byte-by-byte then begins over eight data lines PD[7:0], which correspond to pins 1–4 and 6–9 (FIGS. 3 and 4(b)). The data is latched on the leading edge of signal VSTB, which is asserted on pin 107 (FIG. 4(c)). VSTB is asserted one VCLK after valid data begins to transmit so as to strobe data into the MPEG-2/AC-3 decoder buffer one byte at a time. In the preferred embodiment of the invention, the low and high pulse width ($T_{sl}$ and $T_{sh}$) of the VSTB signal are programmable and may range, for example, from 1 to 4 VCLKs and 2 to 65 VCLKs, respectively. A VERR signal is asserted on pin 108 in the event that an uncorrected data error is detected prior to transmission (FIG. 4(e)). The MPEG-2/AC-3 decoder will mute any erroneous audio data and will discard any video frame that contains erroneous video data.

The VCLK signal is used to sample the SCLK signal after each byte of data has been transferred to determine if data transfer is to continue or stop. So long as SCLK is high, data transfer continues as described above. Data transfer continues until either the requested data is exhausted or the SCLK signal is de-asserted by the MPEG-2/AC-3 decoder.

In the preferred embodiment of the invention, the time period from the initiation of a data request to a data ready state ($T_{rdy}$) may range, for example, from 35 to 110 ns, while the data setup time ($T_{set}$) and the data hold time ($T_{hld}$) may be, for example, 25 ns.

Figure 5:
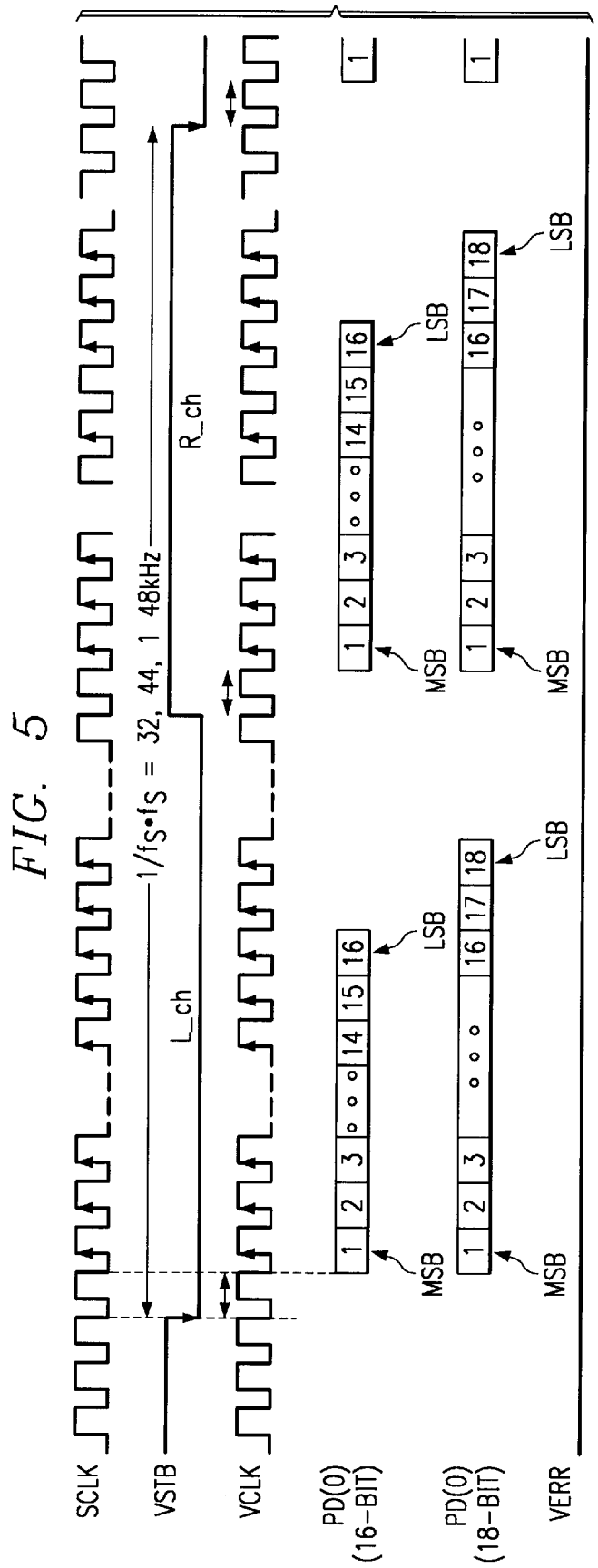
FIG. 5 is a timing diagram of the operation of the present invention in a serial interface mode.

When microcontroller 19 signals data path controller 14 to implement a serial interface for readout of digital audio data, five of the above-mentioned pins are accordingly configured. Serial interface to a stereo DAC will now be described with reference to FIG. 5. Generally, data is read out serially in accordance with the I²S (Phillips) Data Format. Pin 57 (SCLK) receives an oversampling clock from the stereo DAC which samples the serial data at a frequency several times higher than the data rate to synchronize the data and increase the resolution of the output data (FIG. 5(a)). In the preferred embodiment, by way of example, serial data is sampled at 44.1 KHz. Pin 105 then outputs a VCLK signal to serialize and synchronize the serial output data (FIG. 5(c)). Serial data is then transferred only on pin 1 (PD[0]) in either 16-bit format (FIG. 5(d)) or 18-bit format (FIG. 5(e)); pins 2–4 and 6–9 (PD[7:1]) are not used. The VSTB signal (pin 107) is asserted as a left/right frame indicator for audio frame synchronization (FIG. 5(b)). That is, after 16 (or 18) bits of audio have been transmitted to the left channel, the next 16 (or 18) bits are transferred to the right channel. The VERR signal (pin 108) is asserted to indicate that the current data byte contains an error (FIG. 5(f)). If an error is detected, stereo DAC 17 will mute the erroneous audio data.

The above-described pin functions are implemented in a data path controller by a programmed microcontroller. In one embodiment of the invention, for example, microcontroller 19 includes firmware programmed to implement the above-described interface on thirteen pins of a data path controller.

While this invention has been described with reference to an illustrative embodiment, this description is not to be construed in a limiting sense. Various modification to the illustrative embodiment, as well as other embodiments of the invention will be apparent to persons skilled in the art upon reference to this description. It is therefore contemplated that the appended claims will cover any such modifications or embodiments as fall within the true scope of the invention.

What is claimed is:

1. A source device interface comprising:
   an input interface terminal at which a data request signal from an output device is received in a first mode, and at which a sampling signal from said output device is received in a second mode;
   a first output interface terminal at which a sampling/synchronizing signal may be transmitted from said source device to said output device in said first mode, said sampling/synchronizing signal synchronizing and sampling said data request signal, and at which a first synchronizing signal is transmitted from said source device to said output device in said second mode, said first synchronizing signal synchronizing data output;
   at least one data output interface terminal at which requested data is transmitted from said source device to said output device in said first and second modes;
   a second output interface terminal at which a second synchronization signal is transmitted from said source device to said output device at the start of data transmission in said first mode;
   a third output interface terminal at which a data strobe signal is transmitted from said source device to said output device in said first mode, said data strobe signal latching said requested data into said output device, and at which a third synchronization signal is transmitted from said source device to said output device in said second mode, said third synchronization signal synchronizing the left/right audio frames; and
   a fourth output interface terminal at which a data error signal is transmitted from said source device to said output device in said first and second modes, said data error signal indicating that said requested data contains an error.

2. A source device interface according to claim 1, wherein said first mode is a parallel interface mode and said second mode is a serial interface mode.

3. A source device interface according to claim 1, wherein said source device is a digital video disk controller and said output device is a DVD Source Decoder having an MPEG-2/AC-3 decoder.

4. A source device interface according to claim 1, wherein said source device is a digital video disk controller and said output device is DVD-ROM.

5. A source device interface according to claim 1, wherein said data request signal is asserted by changing level from a first level to a second level.

6. A source device interface according to claim 5, wherein said sampling/synchronizing signal samples said data request signal during transmission of each byte of said requested data.

7. A source device interface according to claim 6, wherein said requested data is transmitted so long as said data request signal is at said second level and data remains to be transmitted.

8. A source device interface according to claim 1, wherein said sampling signal samples requested data at a rate higher than a data rate.

9. A source device interface according to claim 1, wherein said data strobe signal latches said requested data on its leading edge and has a pulse width which is programmable.

10. A source device interface according to claim 1, wherein said interface is compatible with the ATAPI standard.

11. A source device interface according to claim 1, wherein a microcontroller is programmed to implement said interface in a data controller of a digital video disk system.

12. A source device interface according to claim 11, wherein said microcontroller directs said interface to operate in said first mode or said second mode.

13. A method of transferring data from a source device to an output device comprising the steps of:
   (a) receiving a data request signal transmitted by said output device in a first mode, or receiving a sampling signal from said output device in a second mode;
   (b) asserting a sampling/synchronizing signal which synchronizes and samples said data request signal in said first mode, or asserting a first synchronizing signal which synchronizes data output in said second mode;
   (c) transmitting requested data from said source device to said output device in said first and second modes;
   (d) asserting a second synchronizing signal indicating the start of data transmission in said first mode;
   (e) asserting a data strobe signal which latches said requested data into said output device in said first mode, or asserting a third synchronization signal which synchronizes the left/right audio frames in said second mode; and
   (f) asserting an error signal when said requested data contains an error in said first and second modes.

14. The method according to claim 13, wherein said data request signal is asserted by changing level from a first level to a second level.

15. The method according to claim 14, wherein said sampling/synchronizing signal samples said data request signal during transmission of each byte of said requested data.

16. The method according to claim 15, wherein said requested data is transmitted so long as said data request signal is at said second level and data remains to be transmitted.

17. The method according to claim 13, wherein said sampling signal samples requested data at a rate higher than a data rate.

18. The method according to claim 13, wherein said data strobe signal latches said requested data on its leading edge and has a pulse width which is programmable.

19. The method according to claim 13, further comprising the step of determining whether to operate in said first mode or said second mode.

20. A digital video disk system comprising:
    a channel interface which receives and amplifies data from a disk, and outputs a control signal indicative of scanning conditions of said disk by a light source;
    a servo DSP which receives said control signal and controls the scannings of said disk by said light source;
    a data path controller which stores said data from said channel interface and outputs said data to one or more playback devices via an interface; and
    a microcontroller programmed to implement said interface in said data path controller, said interface comprising:
        an input interface terminal at which a data request signal from said one or more playback devices is received in a first mode, and at which a sampling signal from said one or more playback devices is received in a second mode;
        a first output interface terminal at which a sampling/synchronizing signal is transmitted to said one or more playback devices in said first mode, said sampling/synchronizing signal synchronizing and sampling said data request signal, and at which a first synchronizing signal is transmitted from said source device to said one more more playback devices, said first synchronizing signal synchronizing data output;
        at least one data output interface terminal at which requested data is transmitted to said one or more playback devices in said first and second modes;
        a second output interface terminal at which a second synchronization signal is transmitted to said one or more playback devices at the start of data transmission in said first mode;
        a third output interface terminal at which a data strobe signal is transmitted to said one or more playback devices, said data strobe signal latching said requested data into said one or more playback devices, and at which a third synchronization signal is transmitted from said source device to said one or more playback devices in said second mode, said third synchronization signal synchronizing the left/right audio frames; and
        a fourth output interface terminal at which a data error signal is transmitted to said one or more playback devices in said first and second modes, said data error signal indicating that said requested data contains an error.

21. A digital video disk system according to claim 20, wherein said one or more playback devices include a DVD Source Decoder having an MPEG-1/AC-3 decoder, and a DVD-ROM.

22. A digital video disk system according to claim 20, wherein said requested data is only transferred over one of said plurality of data output interface terminals.

23. A digital video disk system according to claim 20, wherein said data request signal is asserted by changing level from a first level to a second level.

24. A digital video disk system according to claim 23, wherein said sampling/Synchronizing signal samples said data request signal during transmission of each byte of said requested data.

25. A digital video disk system according to claim 24, wherein said requested data is transmitted so long as said data request signal is at said second level and data remains to be transmitted.

26. A digital video disk system according to claim 20, wherein said sampling signal samples requested data at a rate higher than a data rate.

27. A digital video disk system according to claim 20, wherein said data strobe signal latches said requested data on its leading edge and has a pulse width which is programmable.

28. A digital video disk system according to claim 20, wherein said interface is compatible with the ATAPI standard.

29. A digital video disk system according to claim 20, wherein said microcontroller directs said interface to operate in said first mode or said second mode.

* * * * *